Aug. 15, 1950     R. S. TAYLOR     2,518,837
TRANSMISSION LUBRICATION

Original Filed Sept. 2, 1939     3 Sheets-Sheet 1

INVENTOR
Robert S. Taylor
BY Charles S. Evans
ATTORNEY

Aug. 15, 1950     R. S. TAYLOR     2,518,837
TRANSMISSION LUBRICATION
Original Filed Sept. 2, 1939     3 Sheets-Sheet 2
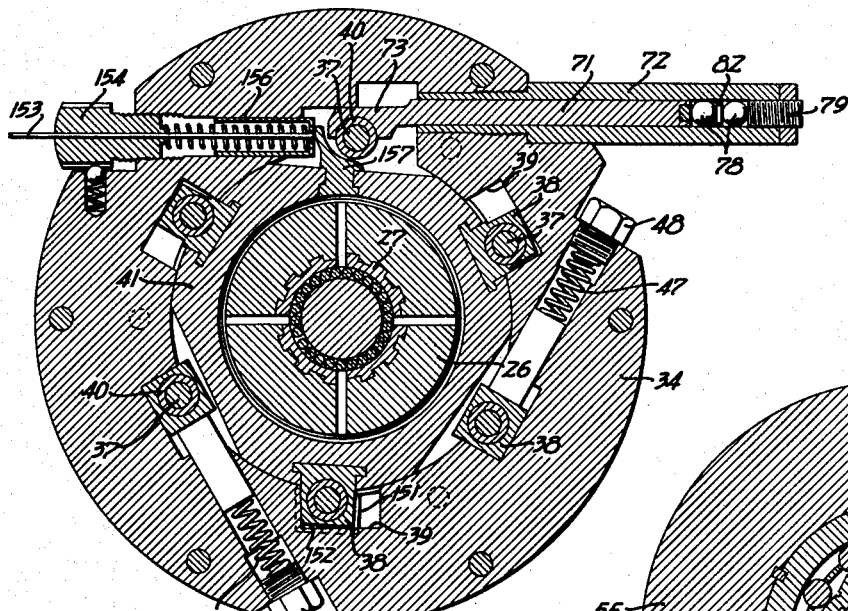
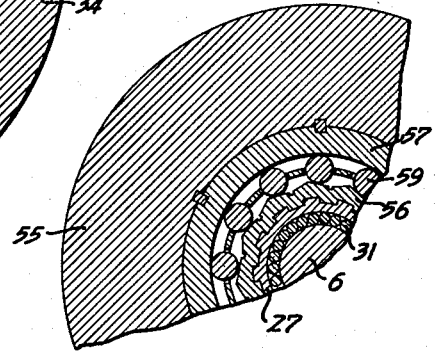
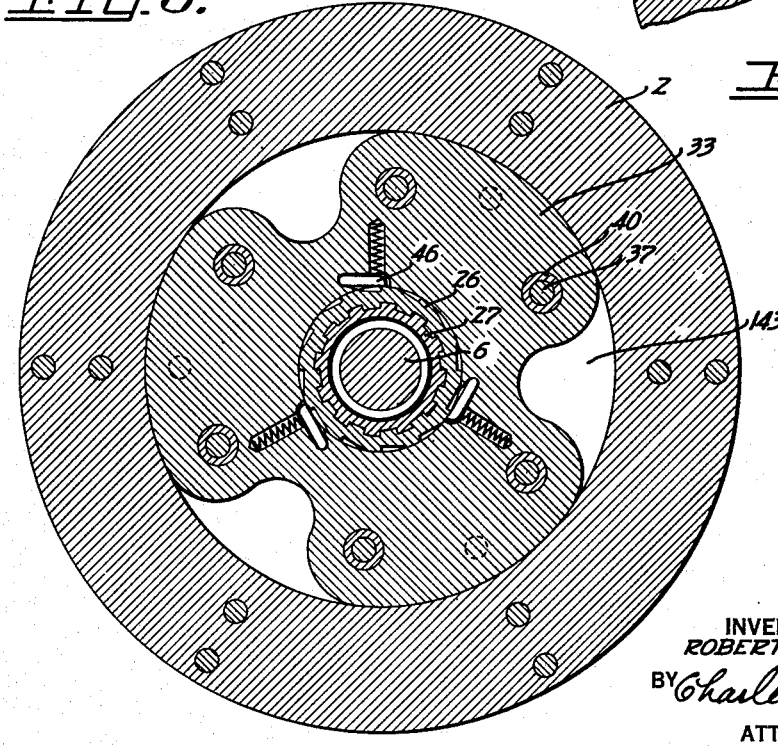
INVENTOR
ROBERT S. TAYLOR
BY Charles S. Evans
ATTORNEY

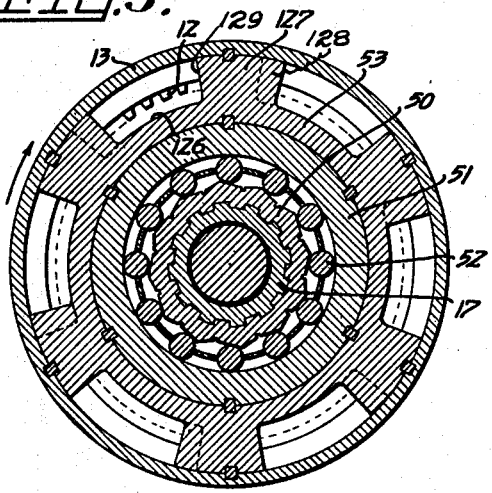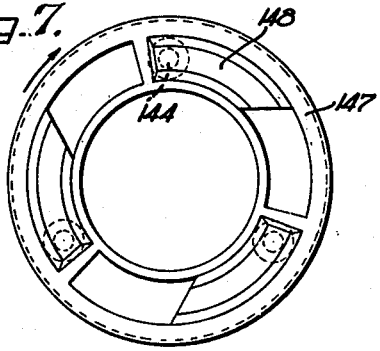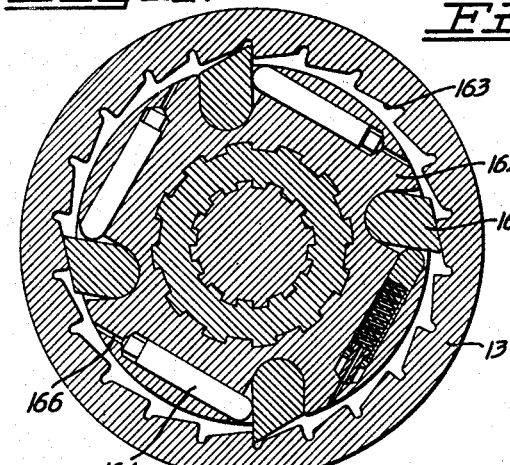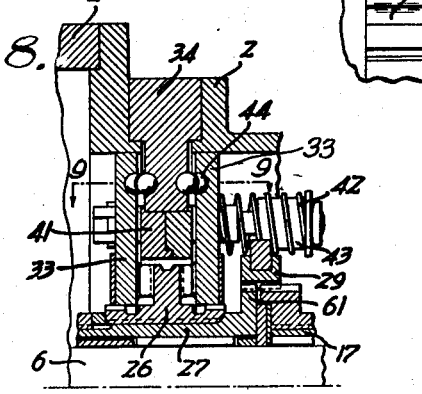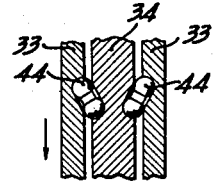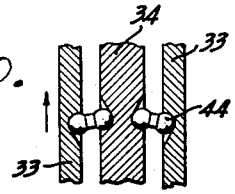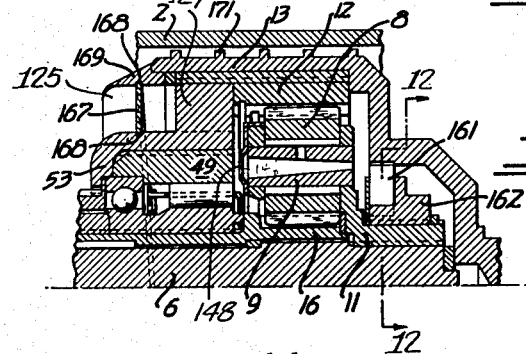

Patented Aug. 15, 1950

2,518,837

UNITED STATES PATENT OFFICE 2,518,837

TRANSMISSION LUBRICATION

Robert S. Taylor, Seattle, Wash.; Florence E. Taylor executrix of said Robert S. Taylor, deceased Original application September 2, 1939, Serial No. 293,214. Divided and this application November 20, 1943, Serial No. 511,134

1 Claim. (Cl. 184—11)

My invention relates to mechanism for changing speed ratios in vehicles; and more particularly to an auxiliary overdrive transmission for automobiles.

The principal object of my invention is to provide an efficient oiling system for my transmission, and especially to provide means for lubricating the parts of the planetary system of the auxiliary transmission.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawings:

Figure 2 is a transverse sectional view of the transmission, taken in a plane indicated by line 2—2 of Figure 1, showing portions of the overdrive brake and lock mechanism.

Figure 3 is a transverse sectional view of the transmission, taken in a plane indicated by line 3—3 of Figure 1, illustrating one of the overdrive brake plates and ratchets.

Figure 4 is a fragmentary transverse sectional view of the transmission, taken in a plane indicated by line 4—4 of Figure 1, showing the inertia wheel and its clutch.

Figure 5 is a transverse sectional view of the transmission taken in a plane indicated by line 5—5 of Figure 1, illustrating the direct drive clutch and oil pump for the planetary system.

Figure 6 is a fragmentary side elevational view of the pump ring apart from the rotor.

Figure 7 is an end elevational view of the auxiliary oil pump for the planet pinions.

Figure 8 is a fragmentary axial sectional view of the transmission, showing the overdrive brake engaged.

Figures 9 and 10 are detail sectional views taken in a plane indicated by line 9—9 of Figure 8, illustrating the brake actuating toggles and plates in engaged and disengaged positions.

Figure 11 is a fragment axial sectional view of the transmission, showing a modified structure embodying a safety ratchet for direct drive; and Figure 12 is a fragmentary sectional view of the ratchet, taken in a plane indicated by line 12—12 of Figure 11.

Figure 1:
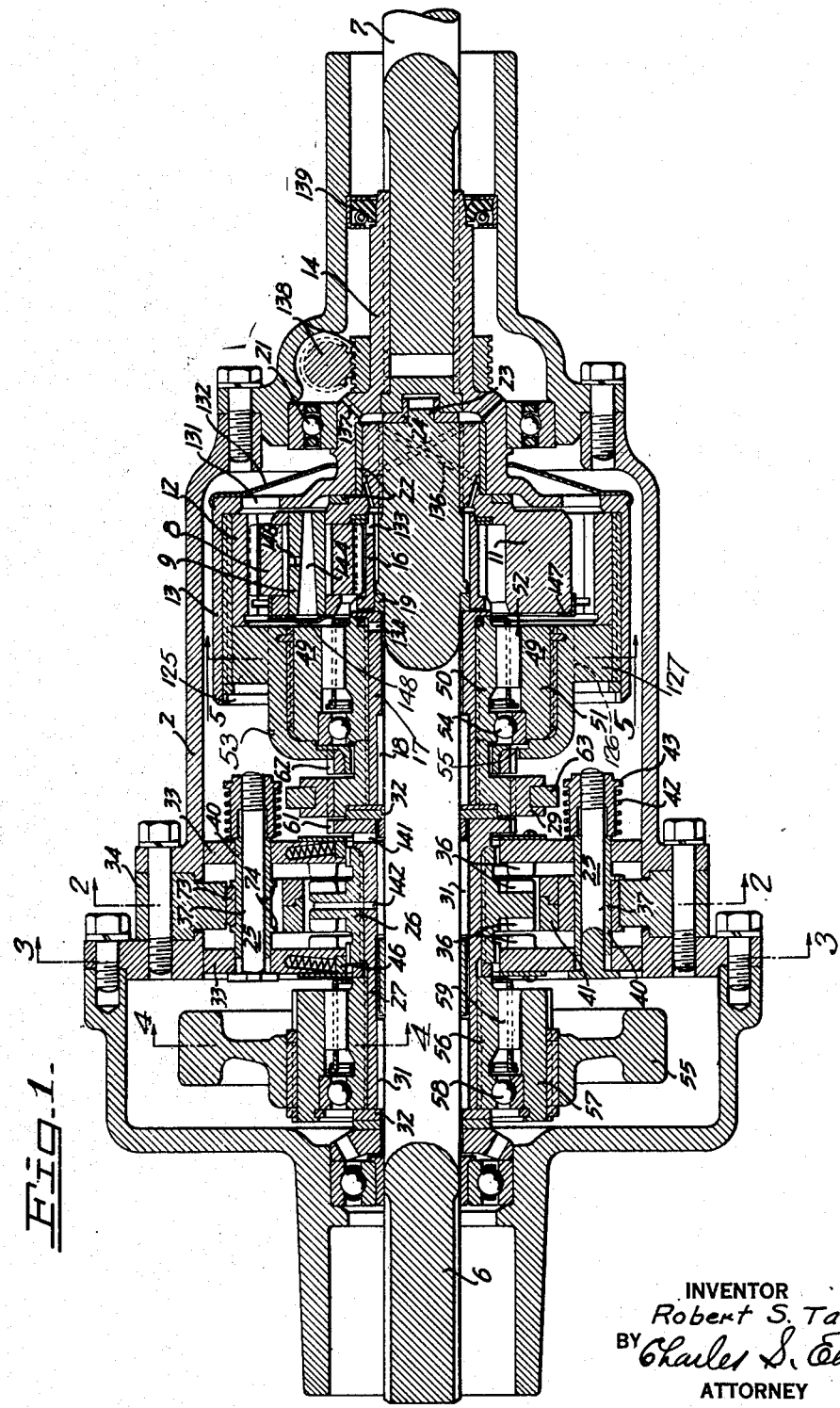
Figure 1 is an axial sectional view of the overdrive transmission embodying the improvements of my invention.

This application is a division of my copending application, Serial Number 293,214, filed September 2, 1939, now issued as Patent No. 2,336,513.

Referring to Figure 1 of the drawings, the auxiliary transmission embodying my invention is enclosed in a housing 2 interposed in the torque tube of an automobile behind the regular transmission. The leading portion 6 of the propeller shaft provides the drive shaft for my unit, and the trailing portion 7 forms the driven shaft.

The overdrive transmission comprises a planetary gear system having a planet pinion 8 journaled on a short shaft 9 mounted on a carrier 11 splined to drive shaft 6. Orbit gear 12 of the planetary system is fixed within a drum-shaped rotor or rotor housing 13 having a hub portion 14 splined on driven shaft 7. Sun gear 16 is end splined to a sleeve 17 journaled about the drive shaft on a needle bearing 18 and provided with a thrust bearing 19 abutting a shoulder on the drive shaft.

The teeth of the orbit gear are spiral, with the forward edge leading the rear edge, so that when oil gets into the orbit gear teeth, the oil is forced to the rear. Such flow is also caused by the teeth of the meshing planet gear.

The planetary system is journaled in a main bearing 21 interposed between the hub of rotor 13 and the housing. Other suitable bearing rings 22 are arranged between the parts of the planetary system. Also, a reduced end 23 of drive shaft 6 is preferably journaled in a pilot bearing 24 mounted coaxially in the end of hub 14.

Means are provided for holding the sun gear against rotation for planetary operation of the gear system to establish an overdrive connection between the shafts. For this purpose a one-way brake generally indicated by reference numeral 25 is arranged to lock the sun gear to the housing; the brake being engaged by reverse (counter-clockwise) rotation of the sun gear under coasting load, and disengaged when the torque of the sun gear in the forward (clockwise) direction under driving load exceeds a predetermined value. In the present specification the reference to direction of rotation (clockwise and counter-clockwise) are taken as viewed from the left in Figure 1; the clockwise rotation being considered as forward since it is the direction of engine rotation.

The brake for establishing the overdrive connection (overdrive brake) comprises a central element 26 splined on a sleeve 27 connectable to the sun gear sleeve through a manually shiftable member 29. Sleeve 27 is journaled on the drive shaft on suitable needle bearings 31; and bearing rings 32 are provided between the ends of the sleeve and adjacent parts. The brake further comprises a pair of annular plates 33 having a limited degree of turning movement with respect to a fixed element 34 of the housing, and having simultaneous lateral movement axially of the unit from the extended position shown in Figure 1 to the collapsed position shown in Figure 8. Complementary teeth 36 are provided on central element 26 and plates 33 of the brake, which teeth are disengaged when the plates are extended and engaged when the plates are collapsed.

Limited turning movement between brake plates 33 and fixed element 34 is provided for by the arrangement shown in Figure 2, comprising a series of pins 37 extending through the plates, and all but one of which pass through guide blocks 38 slidable in notches 39 formed along the inner periphery of the annular fixed element 34. Sleeves 40 surrounding the pins are press fitted in blocks 38 and provide slideways for lateral movement of the plates axially of the pins. Blocks 38 are preferably secured on a ring 41 journaled for oscillation within fixed element 34 to provide added bearing for the plates in their turning movement. As shown in Figure 1, ring 41 is preferably made in two pieces for convenience in assembly.

Springs 42 are provided about projecting ends of pins 37 for urging the brake plates 33 toward collapsed position, and suitable collars 43 are preferably mounted on the pins for limiting outward movement of the plates. Extension and collapse of the plates is controlled by toggle links 44 pivotably connected between the plates and fixed elements 34. As shown in Figures 9 and 10, the toggles operate to collapse the plates when the latter turn backward (counterclockwise); and function to extend the plates when the latter turn forward (clockwise) relative to the fixed element. Backward turning movement is transmitted from the sun gear to the plates by means of spring pressed pawls 46 mounted on the plates and engaging suitable ratchet teeth on central brake element 26, as shown in Figure 3.

When plates 33 are collapsed to engage the brake, the sun gear is held against forward (clockwise) rotation by the holding action of the toggles. The torque of the sun gear is of course transmitted to the brake plates through the engaged teeth 36, and if sufficient clockwise torque is put on the plates the toggles will be extended against the action of springs 42 to disengage the plates from central element 26, thereby releasing the sun gear. Subsequent backward turning of the sun gear then causes the toggles to collapse due to the fact that this backward motion is transmitted to the brake plates through ratchet pawls 46.

Figure 10 shows that toggles 44 are slightly over center in the open position, so that the plates tend to stay extended until reverse thrust on the plates is sufficient to throw the toggles back over center. This stabilizes the brake in its open position, and prevents the brake plates from closing too easily. However, little torque is required to collapse the toggles compared to that needed for their opening movement.

On the other hand, disengagement of the brake is responsive to turning of the sun gear in the opposite (forward) direction, and is also dependent upon the torque of the sun gear in this direction. The angular position of the closed toggles requires considerable torque to open them against the action of springs 42. Once the toggles start extending however they offer less and less resistance to opening movement, so that torque sufficient to start opening them is sufficient to insure complete opening movement.

When the brake is engaged, sun gear 16 is locked to fixed element 34. The act of holding the sun gear against rotation establishes an overdrive connection between the shafts through the planetary gearing. In other words, the driving thrust is transmitted from drive shaft 6 to orbit gear 12 through planet pinion 8 which planetates about the fixed sun gear. The orbit gear thus rotates in a forward (clockwise) direction at a faster rate than the drive shaft, and this overdrive speed is reflected by increased speed of driven shaft 7.

Means are also provided for locking the gears of the planetary system together for unitary rotation to establish a direct or one-to-one drive connection between the shafts when the sun gear is released by disengagement of the overdrive brake. For this purpose a one-way or overrunning clutch generally indicated by reference numeral 49 is interposed between parts of the planetary system, preferably between the sun and orbit gears; and comprises a pair of clutch rings 50 and 51 between which a series of clutch rollers 52 are disposed. The inner ring 50 is splined to sun gear sleeve 17, and the outer ring 51 is secured to the orbit gear rotor through a connecting ring 53 secured within the rotor alongside the orbit gear. A ball bearing 54 is also interposed between the clutch rings to provide a journal when the clutch is overrunning. Figure 5 shows a detail of the clutch parts.

In order to reduce shock when the load is picked up by direct drive clutch 49, I preferably apply an independent load on the sun gear, whereby the thrust of the drive shaft is divided and balanced between the car load on the driven shaft and the independent load on the sun gear during the period of speed change. By this means the sun gear accelerates gradually (as the independent load is overcome) until it reaches the speed of the orbit gear. This is equivalent to providing a moving fulcrum for the power thrust during the speed change, and results in a quiet, smooth action without interruption in the transfer of driving thrust from one shaft to another.

The independent load is preferably supplied by a small fly wheel 55 operatively connected with the sun gear to increase the inertia of the latter during the period of shift from overdrive to direct drive. This fly wheel is preferably mounted on sun gear extension sleeve 27, and a one-way or overrunning clutch is preferably interposed between the flywheel and sleeve to allow the sun gear to pick up the load of the fly wheel only in the forward direction of sun gear rotation. The fly wheel therefore does not resist backward rotation of the sun gear at the time of brake engagement. The one-way clutch preferably comprises rings 56 and 57 separated by a bearing 58 and embracing the clutch roller 59; the inner ring being splined to sleeve 27, and the outer ring providing a carrier for the fly wheel.

Means are also preferably provided for optionally locking the sun gear to the orbit gear to positively connect them for unitary rotation. For this purpose the clutch member 29 is shiftable to engage either teeth 61 on sleeve 27 or teeth 62 on an element splined to bell ring 53 of the orbit gear head. In the latter case the overdrive brake is rendered inactive, and the unit is positively locked in direct drive. Suitable shifting means such as a yoke 63 connected with a lever in the driver's compartment is arranged to give the driver control of this optional shift.

My invention embodies an improved oiling system for the auxiliary transmission unit. Housing 2 provides a reservoir for holding oil in the usual manner, and the majority of the parts secure adequate lubrication by oil picked up by the rotating elements. The planetary system enclosed within rotor 13 however requires additional consideration.

As shown in Figures 1, 5 and 6, I provide a series of openings 126 about the periphery of ring 53 with lugs 127 between the openings for supporting engagement with rotor 13. These openings 126 are in the bottom of the annular groove 125, which is formed between the parts of the rotor housing and in one of the side walls thereof. The lug sides 128 facing the direction of rotation and therefore forming the leading edges, are inclined as shown in Figure 6, that is, backwardly relative to the direction of rotation and inwardly with respect to the rotor or rotor housing 13, in order to force oil into the hollow rotor. Lugs 127 therefore also function as pumping impellers. Back sides 129 of the impellers are preferably flat surfaces lying normal to the direction of rotation, so that the partial vacuum developed by cavitation tends to suck the oil into the rotor.

Discharge openings 131 are provided at the opposite end of the rotor, and an annular flange 132 is provided to maintain an adequate oil level within a rotor. Part of the oil within the rotor circulates out past clutch rollers 52 and hence to bearing 54 and out through suitable openings 55 provided at the splined connection between clutch element 62 and the bell-shaped rotor ring 53. Part of the oil within the rotor also flows to the bearings along the drive shaft through suitable oil holes 133 and 134 through the sun gear and its sleeve. Oil through holes 133 also circulates outwardly through helical grooves 136 and hence through holes 137 to the speedometer gears 138 and then back through bearing 21 into the main body of the housing. A suitable oil retaining ring 139 is provided outwardly of speedometer gears 138. Oil holes 141 and 142 are also preferably provided in sun gear extension sleeve 27 and central brake element 26 for oiling other bearing surfaces along the drive shaft. As shown in Figure 3, brake plates 33 are preferably provided with notched openings 143 to allow free outward flow of oil from between the plates when the latter collapse.

Means are further provided for supplying oil to the planet pinion bearings. For this purpose a tapered passage 144 is provided through pinion shaft 9, with a transverse passage 146 to the bearing surfaces. An annular plate 147 is secured over the end face of the planet pinion mounting 11, and is provided with partially raised scoop portions 148 for picking up oil and forcing it into the pinion shaft passages. See Figure 7. Oil is therefore supplied under pressure to the planet pinion bearings.

Cushioning means are also preferably provided for relieving shock between brake pin blocks 38 and fixed element 34 when the blocks move up against the ends of notches 39. As shown in Figure 2, the lower block 38 is provided with flanges 151 for entrapping a quantity of oil between the block and an end of notch 39. A small clearance is provided between the block and base of the recess to form a restricted passage 152 through which the entrapped oil may gradually bleed out. This simple cushioning means effectively relieves shock between the parts.

Figures 11 and 12 show a modified arrangement of the planetary gear system, embodying a safety clutch in combination with direct drive clutch 49. The safety clutch is normally inactive and operates to connect the shafts for direct drive only in the event of failure of clutch 49. The safety clutch is preferably interposed between the planetary pinion carrier 11 and rotor 13 for convenience, and may be an overrunning clutch similar to clutch 49. I prefer however to employ a ratchet device comprising spring pressed pawls 161 pivoted in sockets formed in a ring 162 splined to the hub of the pinion carrier. Pawls 161 project in a substantially radial direction from ring 162 and are engageable with clutch teeth 163 formed on the interior of rotor 13. The pawls have a limited degree of pivotal movement in their sockets, and are urged outwardly by centrifugal force and also by spring pressed tangent plungers 164, slidable in recesses formed in ring 162 and vented through passages 166. The outer faces of the pawls are inclined and lie parallel to complementary inclined faces of the ratchet teeth so that the pawl faces may slide along the back faces of the teeth prior to final engagement. By this arrangement, the spring pressure of the pawls against the inclined faces of the ratchet teeth tends to turn pawl ring 162 clockwise relative to the toothed ring to force the pawls into full engagement.

There are a plurality, say four, of the pawls and these are offset to engage in pairs so that pawls do not have to move the full width of a tooth prior to engagement. A certain amount of relative movement exists however, prior to tooth engagement, and this lost motion allows the faster acting clutch 49 to engage first. Therefore, the slower acting ratchet clutch will not come into play unless the regular clutch 49 for some reason fails to operate.

This improved radial pawl ratchet has several advantages over an ordinary tangent pawl device because it tends to automatically move into engagement, and furthermore the final pivotal motion of the pawls operates to bring them into full engagement with the teeth to insure a positive lock.

Figure 11 also shows a modified structure for the oiling system, comprising a screw type pump having a single convolution impeller 167 formed by a strip making a single turn and seated in helical grooves 168 cut in the annular groove 25 on the outer periphery of bell ring 53 and on the inner periphery of an annular nose piece 169 secured at the end of rotor 13. These two parts 53 and 169 being spaced apart as shown, form an annular groove in which the single turn strip or impeller 167 is disposed. This impeller screw may be used alone or in combination with impellers 127 previously described; the screw having the advantage of moving a larger volume of oil past the planet pinions and thereby serve to further reduce the temperature of these parts as well as to insure adequate lubrication. If desired, a helical rib-like impeller 171 may also be mounted on the outer periphery of the rotor to project into the space between the latter and the housing 2, to provide means for pumping oil past the outer regions of the rotor.

I claim:

In a planetary gear system having a planet pinion shaft mounted on a carrier, a rotor having a lateral wall and enclosing the gear system, pump means in the lateral wall of the rotor for feeding oil into the rotor, an oil passage in said shaft, and pump means mounted on the carrier between the carrier and the lateral wall for feeding oil into said passage.

ROBERT S. TAYLOR.

REFERENCES CITED

The following references are of record in the file of this patent:

UNITED STATES PATENTS

| Number | Name | Date |
|---|---|---|
| 573,963 | Corn | Dec. 29, 1896 |
| 868,657 | Haas | Oct. 22, 1907 |
| 1,757,476 | Rennerfelt | May 6, 1930 |
| 2,178,900 | Starr | Nov. 7, 1939 |
| 2,229,337 | Neracher | Jan. 21, 1941 |
| 2,258,077 | Taylor | Oct. 7, 1941 |
| 2,263,936 | Taylor | Nov. 25, 1941 |